(12) United States Patent
Cael et al.

(10) Patent No.: US 6,814,899 B2
(45) Date of Patent: Nov. 9, 2004

(54) ENHANCED K-TYPE POLARIZER

(75) Inventors: John J. Cael, Upton, MA (US); Jason W. Balich, Beverly, MA (US); Pradnya V. Nagarkar, Newton, MA (US); Kim M. Vogel, Lake Elmo, MN (US); Hassan Sahouani, Hastings, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 100 days.

(21) Appl. No.: 10/118,489

(22) Filed: Apr. 6, 2002

(65) Prior Publication Data

US 2003/0170478 A1 Sep. 11, 2003

Related U.S. Application Data

(63) Continuation-in-part of application No. 10/074,874, filed on Feb. 12, 2002.

(51) Int. Cl.$^7$ .............................................. B29D 11/00
(52) U.S. Cl. ...................... 264/1.34; 264/1.36; 264/1.7; 264/2.7
(58) Field of Search ............................. 264/1.31, 1.34, 264/2.7, 1.36, 1.38, 1.7, 494

(56) References Cited

U.S. PATENT DOCUMENTS

| | | | |
|---|---|---|---|
| 2,445,555 A | 7/1948 | Binda | |
| 3,914,017 A | 10/1975 | Bedell et al. | |
| 4,396,642 A | 8/1983 | Bolt et al. | |
| 4,818,624 A | 4/1989 | Downey, Jr. | |
| 4,859,039 A | 8/1989 | Okumura et al. | |
| 5,666,223 A | 9/1997 | Bennett et al. | 359/490 |
| 5,925,289 A | 7/1999 | Cael et al. | 252/585 |
| 5,973,834 A | * 10/1999 | Kadaba et al. | 359/490 |
| 6,096,375 A | 8/2000 | Ouderkirk et al. | 427/163.1 |
| 6,111,697 A | 8/2000 | Merrill et al. | 359/497 |
| 6,113,811 A | 9/2000 | Kausch et al. | 252/585 |
| 6,307,676 B1 | 10/2001 | Merrill et al. | 359/497 |

FOREIGN PATENT DOCUMENTS

| | | |
|---|---|---|
| EP | 0333407 | 9/1989 |
| EP | 1057623 | 12/2000 |
| JP | 09197669 | 7/1997 |
| WO | WO 97/21123 | 6/1997 |

OTHER PUBLICATIONS

John J. Cael et al., Molecular and Spectroscopic Properties of a Polarizer Based on a Block Copolymer of Vinylalcohol and Acetylene, Macromol. Symp. 154, 45–57 (2000), Wiley–VCH Verlag GmbH ISBN 3–527–30 133–X.

* cited by examiner

*Primary Examiner*—Mathieu D. Vargot
(74) *Attorney, Agent, or Firm*—Stephen W. Buckingham (57) ABSTRACT

An enhanced K-type polarizer includes a molecularly oriented sheet of polyvinylalcohol/polyvinylene block copolymer material having polyvinylene blocks formed by molecular dehydration of a sheet of polyvinylalcohol wherein the molecularly oriented sheet comprises light-polarizing molecules of polyvinylalcohol/polyvinylene block copolymer material varying in length, n, of conjugated repeating vinylene unit of the polyvinylene block, wherein an absorption concentration of each of the polyvinylene blocks in the range of n=19 to 25 is not less than approximately 65% of the absorption concentration of any of the polyvinylene blocks in the range of n=14 or 15, wherein the absorption concentration is determined by absorption of wavelengths from about 200 nm to about 700 nm by the polyvinylene blocks, and wherein the molecularly oriented sheet exhibits a photopic dichroic ratio, $R_D$, of at least approximately 75.

38 Claims, 7 Drawing Sheets

| Abs(550nm)/Abs(700nm) | | |
|---|---|---|
| 4.0X | 5.0X | 6.0X |
| 4.19 | 3.62 | 2.79 |

ENHANCED K-TYPE POLARIZER

CROSS-REFERENCE TO RELATED APPLICATIONS

This application is a continuation-in-part of pending application Ser. No. 10/074,874 filed Feb. 12, 2002, entitled "PROCESS FOR PREPARING A K-TYPE POLARIZER" which is incorporated by reference herein.

FIELD OF THE INVENTION

This invention relates to synthetic dichroic plane polarizers based on molecularly oriented polyvinyl alcohol sheets and, in particular, to a high efficiency K-type polarizing sheet.

BACKGROUND OF THE INVENTION

Normally, light waves vibrate in a large number of planes about the axis of a light beam. If the waves vibrate in one plane only, the light is said to be plane polarized. Several useful optical ends and effects can be accomplished by plane polarized light. For example, in the manufacture of electrooptical devices, such as liquid crystal display screens, crossed polarizers are used in conjunction with an addressable liquid crystal interlayer to provide the basis for image formation. In the field of photography, polarizing filters have been used to reduce the glare and the brightness of specular reflection. Polarizing filters (circular or otherwise) have also been used for glare reduction in display device screens.

Linear light polarizing films, in general, owe their properties of selectively passing radiation vibrating along a given electromagnetic radiation vector (and absorbing electromagnetic radiation vibrating along a second given electromagnetic radiation vector) to the anisotropic character of the transmitting film medium. Dichroic polarizers are absorptive, linear polarizers having a vectoral anisotropy in the absorption of incident light. The term "dichroism" is used herein as meaning the property of differential absorption (and transmission) of the components of an incident beam of light depending on the direction of vibration of the components. Generally, a dichroic polarizer will transmit radiant energy along one electromagnetic vector and absorb energy along a perpendicular electromagnetic vector. A beam of incident light, on entering a dichroic polarizer, encounters two different absorption coefficients, one low and one high so that the emergent light vibrates substantially in the direction of low absorption (high transmission).

Among synthetic dichroic polarizers are K-type polarizers. A K-type polarizer derives its dichroism from the light-absorbing properties of its matrix, not from the light-absorbing properties of dye additives, stains, or suspended crystalline material. Typically K-type polarizers comprise a sheet of oriented poly(vinyl alcohol) having an oriented suspension of a dehydration product of polyvinyl alcohol (i.e., polyvinylene). K-type polarizers of this kind are formed by heating the polymeric sheet in the presence of a dehydration catalyst, such as vapors of aqueous hydrochloric acid, to produce conjugated polyvinylene blocks and unidirectionally stretching the polymeric sheet prior to, subsequent to, or during the dehydration step to align the poly(vinyl alcohol) matrix. By orienting the poly(vinyl alcohol) matrix unidirectionally, the transition moments of the conjugated polyvinylene blocks or chromophores are also oriented and the material becomes visibly dichroic. A second orientation step or extension step may be employed after the dehydration step as described in U.S. Pat. No. 5,666,223 (Bennett et al.). Summary of the Invention In general, in one aspect, the invention features a method for making a polarizer from a polymeric sheet having a predetermined original length and including a hydroxylated linear high polymer. The polymeric sheet is stretched from greater than 5.0 times to approximately 6.0 times the original length. A suitable dehydration catalyst is introduced to the polymeric sheet. The polymeric sheet and the catalyst is heated at a temperature appropriate to effect partial dehydration of the polymeric sheet wherein light absorbing, vinylene block segments are formed.

Implementations of the invention may also include one or more of the following features. The hydroxylated linear high polymer may be polyvinyl alcohol, polyvinyl acetal, polyvinyl ketal, or polyvinyl ester. The introducing step may include exposing the polymeric sheet to fuming acidic vapors. The introducing step may include coating the polymeric sheet with an acid coating. The introducing step may include placing an acid donor layer adjacent to the polymeric sheet and exposing the acid donor layer to a radiant energy to release one or more molecules of acid. The radiant energy may be thermal energy or ultraviolet light energy. The stretching may be bidirectional relaxed, bidirectional unrelaxed, unidirectional relaxed, unidirectional unrelaxed, or parabolic.

The method may include subjecting the polymeric sheet to a boration treatment at an elevated temperature. The method may also include unidirectionally extending the stretched and heated polymeric sheet greater than 0% to about 70% of the stretched length. The subjecting step and the extending step may be performed concurrently. The subjecting step may be performed before the extending step. The boration treatment temperature may be greater than about 80° C.

The method may include adding at least one dichroic dye to the polymeric sheet. The method may include subjecting the polymeric sheet to a boration treatment at an elevated temperature, wherein the adding step and the subjecting step are performed concurrently. The method may include subjecting the polymeric sheet to a boration treatment at an elevated temperature, wherein the adding step is performed before the subjecting step. The dichroic dye may be a yellow dye, a blue dye, or a combination thereof. The boration treatment may include placing the polymeric sheet in contact with an aqueous solution comprising boric acid. The boric acid concentration may range from about 5% to about 20%. The aqueous solution may include borax. The borax concentration may range from about 1% to about 7%. The at least one dichroic dye may be a yellow dye, a blue dye, or a combination thereof. The polymeric sheet may be supported on a carrier web or a support layer.

In general, in another aspect, the invention features a method for making a polarizer from a polymeric sheet having a predetermined original length and including a hydroxylated linear high polymer. The polymeric sheet is stretched from approximately 3.5 to approximately 6.0 times the original length. A suitable dehydration catalyst is introduced to the polymeric sheet. The polymeric sheet and the catalyst is heated at a temperature appropriate to effect partial dehydration of the polymeric sheet wherein light absorbing, vinylene block segments are formed. The polymeric sheet is subjected to a boration treatment at a temperature greater than about 80° C. The polymeric sheet is unidirectionally extended greater than 0% to about 70% of the stretched length.

Implementation of the invention may also include one or more of the following features. The hydroxylated linear high polymer may be polyvinyl alcohol, polyvinyl acetal, polyvinyl ketal, or polyvinyl ester. The introducing step may include exposing the polymeric sheet to fuming acidic vapors. The introducing step may include coating the polymeric sheet with an acid coating. The introducing step may include placing an acid donor layer adjacent to the polymeric sheet and exposing the acid donor layer to a radiant energy to release one or more molecules of acid. The radiant energy may be thermal energy or ultraviolet light energy.

The stretching may be bidirectional relaxed, bidirectional unrelaxed, unidirectional relaxed, unidirectional unrelaxed, or parabolic. The subjecting step and the extending step may be performed concurrently.

The method may include adding at least one dichroic dye to the polymeric sheet. The adding step and the subjecting step may be performed concurrently. The adding step may be performed before the subjecting step. The at least one dichroic dye may be a yellow dye, a blue dye, or a combination thereof. The boration treatment may include placing the polymeric sheet in contact with an aqueous solution comprising boric acid. The boric acid concentration may range from about 5% to about 20%. The aqueous solution may include borax. The borax concentration may range from about 1% to about 7%. The polymeric sheet may be supported on a carrier web or a support layer.

In general, in another aspect, the invention features a light polarizer having a molecularly oriented sheet of polyvinylalcohol/polyvinylene block copolymer material having polyvinylene blocks formed by molecular dehydration of a sheet of polyvinylalcohol wherein the molecularly oriented sheet includes light-polarizing molecules of polyvinylalcohol/polyvinylene block copolymer material varying in length, n, of conjugated repeating vinylene unit of the polyvinylene block. An absorption concentration of each of the polyvinylene blocks in the range of n=19 to 25 is not less than approximately 65% of the absorption concentration of any of the polyvinylene blocks in the range of n=14 or 15, wherein the absorption concentration is determined by absorption of wavelengths from about 200 nm to about 700 nm by the polyvinylene blocks. The molecularly oriented sheet exhibits a photopic dichroic ratio, $R_D$, of at least approximately 65.

Implementations of the invention may also include one or more of the following features. The polarizer may include a dichroic dye. The dichroic dye may be a yellow dye, a blue dye, or a combination thereof. A portion of the molecularly oriented sheet may include a moisture-resistance imparting complex of the polyvinyl alcohol/polyvinylene block copolymer and boric acid. A portion of the molecularly oriented sheet may include a moisture-resistance imparting complex of the polyvinyl alcohol/polyvinylene block copolymer and a borax.

In general, in another aspect, the invention features a light polarizer having a molecularly oriented sheet of polyvinylalcohol/polyvinylene block copolymer material having polyvinylene blocks formed by molecular dehydration of a sheet of polyvinylalcohol wherein the molecularly oriented sheet includes light-polarizing molecules of polyvinylalcohol/polyvinylene block copolymer material varying in length, n, of conjugated repeating vinylene unit of the polyvinylene block. An absorption concentration of the polyvinylene blocks at n=25 is not less than approximately 65% of the absorption concentration of any of the polyvinylene blocks in the range of n=14 or 15 wherein the absorption concentration is determined by absorption of wavelengths from about 200 nm to about 700 nm by the polyvinylene blocks. The molecularly oriented sheet exhibits a photopic dichroic ratio, $R_D$, of at least approximately 65.

Implementations of the invention may also include one or more of the following features. The polarizer may include a dichroic dye. The dichroic dye may be a yellow dye, a blue dye, or a combination thereof. A portion of the molecularly oriented sheet further may include a moisture-resistance imparting complex of the polyvinyl alcohol/polyvinylene block copolymer and boric acid. A portion of the molecularly oriented sheet further may include a moisture-resistance imparting complex of the polyvinyl alcohol/polyvinylene block copolymer and a borax.

In general, in another aspect, the invention features a light polarizer having a first polymeric sheet having a first transmission direction and a second polymeric sheet having a second transmission direction. The first polymeric sheet and the second polymeric sheet are molecularly oriented sheets of polyvinylalcohol/polyvinylene block copolymer material having the polyvinylene blocks thereof formed by molecular dehydration of a sheet of polyvinylalcohol. The first transmission direction is oriented 90 degrees from the second transmission direction. The ratio of absorption at 550 nm to absorption at 700 nm is less than approximately 3.75.

Implementations of the invention may also include one or more of the following features. The polarizer may include a dichroic dye. The dichroic dye may be a yellow dye, a blue dye, or a combination thereof. The molecularly oriented sheet may include light-polarizing molecules of polyvinylalcohol/polyvinylene block copolymer material varying in length, n, of conjugated repeating vinylene unit of the polyvinylene block, wherein an absorption concentration of each of the polyvinylene blocks in the range of n=19 to 25 is not less than approximately 65% of the absorption concentration of any of the polyvinylene blocks in the range of n=14 or 15, wherein the absorption concentration is determined by absorption of wavelengths from about 200 nm to about 700 nm by the polyvinylene blocks, and wherein the molecularly oriented sheet exhibits a photopic dichroic ratio, $R_D$, of at least approximately 65. The molecularly oriented sheet may include light-polarizing molecules of polyvinylalcohol/polyvinylene block copolymer material varying in length, n, of conjugated repeating vinylene unit of the polyvinylene block, wherein an absorption concentration of the polyvinylene blocks at n=25 is not less than approximately 65% of the absorption concentration of any of the polyvinylene blocks in the range of n=14 or 15, wherein the absorption concentration is determined by absorption of wavelengths from about 200 nm to about 700 nm by the polyvinylene blocks, and wherein the molecularly oriented sheet exhibits a photopic dichroic ratio, $R_D$, of at least approximately 65.

An advantage of the present invention is it provides an improved K-type polarizer with a higher efficiency and improvement in color.

Another advantage of the present invention is it provides an improved process for producing K-type polarizers.

An additional advantage of the present invention is it provides an improved crossed polarizer with a significant reduction in the leakage in both the blue spectral and red spectral regions.

The details of one or more embodiments of the invention are set forth in the accompanying drawings and the description below. Other features, objects, and advantages of the invention will be apparent from the description, drawings and examples, and from the claims.

DETAILED DESCRIPTION

The present invention relates to an enhanced K-type polarizer and method of making in which a higher polarization efficiency and improvement in color is obtained for a single polarizing sheet and pair of polarizing sheets in the crossed state. The polarizer comprises a molecularly oriented sheet of polyvinylalcohol/polyvinylene block copolymer material having the polyvinylene blocks thereof formed by molecular dehydration of a sheet of polyvinylalcohol. The molecularly oriented sheet of polyvinylalcohol/polyvinylene block copolymer material comprises a uniform distribution of light-polarizing molecules of polyvinylalcohol/polyvinylene block copolymer material varying in the length (n) of the conjugated repeating vinylene unit of the polyvinylene block of the copolymer throughout the range of from 2 to 25. The degree of orientation of the light polarizing molecules increases throughout the range with increasing length (n) of the polyvinylene blocks. Further, the concentration of each of the polyvinylene blocks, as determined by the absorption of light by the blocks, remains comparatively constant through the range. The degree of orientation of the molecules in conjunction with the concentration distribution of each polyvinylene block is sufficient to impart to the polymeric sheet a photopic dichroic ratio ($R_D$), of at least 75.

The dichroic ratio, $R_D$ is defined as:

$$R_D = A_z/A_y$$

where $A_z$ and $A_y$ are determined by absorption spectroscopy using a polarized light source.

Absorption is measured using a UV/VIS spectrophotometer having a polarizer placed, for example, in the sample beam. For measurement of photopic dichroic ratio, a beam of white light passes through a sample, through a high efficiency polarizing analyzer, through a photopic filter and then through a photo-detector. For measurement of spectral dichroic ratio, the beams are of a wavelength correspondent with the conjugation length of the chromophore under investigation. In both cases, an absorption spectrum between 400 nm and 700 nm is considered with the optical axis of a film sample being parallel to the optical axis of the polarizer in the sample beam ($A_z$) and then after rotating the sample polarizer over 90 degrees ($A_y$). Thus, the absorption at the wavelength of maximum absorption is determined, from which $R_D$ can be calculated.

A method for producing an enhanced K-type polarizer of the present invention involves using a higher initial stretch of the polymeric sheet along with a higher stretching temperature. An additional extension step may or may not be employed. In addition, a higher boration temperature may also be used before, during, or after the optional extension step.

The manufacture of an enhanced K-type polarizing sheet typically begins with a polymeric sheet of an hydroxylated linear high polymer having a predetermined original length, and generally having a thickness on the order of 0.001 inches (0.025 mm) to 0.004 inches (0.102 mm). A suitable stretching device or other similar mechanism or system may be used to initially stretch the polymeric sheet from approximately 3.5 times to approximately 6.0 times the original length of the polymeric sheet, and preferably from greater than 5.0 times to approximately 6.0 times the original length. The stretching step is conducted at a temperature above the glass transition temperature of the polymeric material and preferably at a temperature greater than 300° F. Stretching may be effected by the provision of heat generating elements, fast rollers, and slow rollers. For example, the difference in the rotational rate between rollers may be exploited to create corresponding tension in the area of the sheet transported therebetween. When heat generating elements heat the sheet, stretching is facilitated and more desirably effected. Temperature control may be achieved by controlling the temperature of heated rolls or by controlling the addition of radiant energy, e.g., by infrared lamps, as is known in the art. A combination of temperature control methods may be utilized.

The film may be stretched in the machine direction, as with a length orienter, in width using a tenter, or at diagonal angles. Due to the relative weak transverse strength of an oriented vinylalcohol polymer, it may be advantageous to cast, laminate or otherwise affix the oriented film onto a substrate such as a support film layer, heated roller, or carrier web. A support layer, when bonded or otherwise affixed to the polymer film provides mechanical strength and support to the article so it may be more easily handled and further processed. However, the cast film may be oriented and subsequently bonded or affixed to a support film layer after orientation. Useful methods of orientation are known in the art and reference may be made to U.S. Pat. No. 5,973,834 (Kadaba et al.), U.S. Pat. No. 5,666,223 (Bennett et al.) and U.S. Pat. No. 4,895,769 (Land et al.).

It will be understood however, that in unidirectional orientation, the film may be restrained from shrinking in the lateral direction by means of a tenter apparatus, and such restraint does impose a small degree of bidirectional orientation to the film. If desired, the support layer may be oriented in a direction substantially transverse to the direction of orientation of the vinylalcohol polymer film. By substantially transverse, it is meant that the support layer may be oriented in a direction ±45° from the direction of orientation of the vinylalcohol polymer film layer. Such orientation of the support layer provides greater strength in the transverse direction than does an unoriented support layer.

In practice, the support layer may be oriented before or after coating of the vinylalcohol polymer layer. In one embodiment, the vinylalcohol polymer may be oriented substantially uniaxially and bonded to an oriented support layer so that the directions of the orientations of the two layers are substantially transverse. In another embodiment, the support layer may be oriented in a first direction, the vinylalcohol polymer bonded or coated thereon, and the composite article oriented in a second direction substantially transverse to the direction of first orientation. In this embodiment, the resulting article comprises a bidirectionally oriented support layer, and a substantially unidirectionally oriented vinylalcohol polymer layer.

Typically with a support layer, the oriented polymeric sheet is subjected to a dehydration step whereupon the oriented sheet is treated to "convert" a portion thereof to polarizing molecules consisting of block copolymers of poly(vinylene-co-vinyl alcohol). This can be achieved, for example, by exposing the oriented sheet to a suitable dehydration catalyst, preferably hydrochloric acid vapors, followed by heating the fumed sheet at temperatures in excess of 125° C. In one embodiment, the oriented polymer side (i.e., the under surface) of the support-borne sheet is maintained a short distance from a vat of fuming acid for a period of approximately twenty seconds to one minute. With the acid fumes acting as a catalyst, the oriented sheet is then passed through a heating oven where it is subjected to a temperature of from approximately 250° F. to 350° F. for about one-half minute (or longer), whereby the oriented sheet is "converted" into the desired dehydration product, polyvinylene. The desired degree of dehydration may vary, depending on the desired contrast and the film thickness but is typically in the range of 0.1 to 10%, preferably 1 to 5% of the available hydroxyl groups are converted to vinylene groups (i.e., $-CH_2-CHOH-\rightarrow-CH=CH-$).

The temperature and duration of such a heating step can affect the optical properties of the finished polarizer. It will be understood that there is a balance between time, temperature and concentration of the acid for a given optical property. For example, a lower transmission polarizer may be achieved at a given temperature by using longer exposure times. At a given exposure time, lower transmission may by achieved at higher temperatures. Useful temperatures and times are in the range of 90° C. to about 175° C. and times of a few seconds to about five minutes. Generally, if a high transmission polarizer is desired, lower residence time over the tank and oven temperatures are preferred. If a lower transmission polarizer is desired then higher heating temperatures should be used.

The dehydration step may also be achieved by coating the oriented sheet with an acid coating and then subjecting it to a heating step to effect the dehydration of the polymeric sheet. Another method entails coating the oriented sheet with an acid donor layer wherein a photoacid generator or a thermal acid generator is dissolved or dispersed in the donor layer and upon irradiation with a radiant energy the incipient acid diffuses into the adjacent vinylalcohol polymer matrix to effect partial dehydration of the vinylalcohol polymer to conjugated vinylene [poly(acetylene)] segments. The radiant energy may be thermal energy or ultraviolet light energy, depending on the type of acid generator used.

The specific conditions of heating time, temperature and acid concentration are not particularly critical. Considerable latitude in process parameters exists without detriment to the formation of the copolymer and its concomitant polarization properties. For example, the extent of penetration of the acid fumes into the oriented sheet may be controlled by altering the temperature of the acid in the vat, altering the time of exposure of the oriented sheet to the fumes, and altering the temperature of the heating element positioned adjacent the sheet. Further, suitable results can be obtained by first exposing an unstretched sheet of polyvinyl alcohol to the dehydration catalyst followed by the simultaneous heating and stretching of the sheet.

The polymeric sheet is then optionally subjected to a second orientation step or extension step in which the oriented polarizer is stretched a second time from greater than 0% to about 70% beyond that obtained in the first stretch. The polymeric sheet may also be subjected to a boration step in which the oriented sheet is treated with an aqueous solution of boric acid and borax to effect relaxation and crosslinking. The extension step may be carried out before, during or after the polymeric sheet is in a boration solution. For example, the polymeric sheet can be submerged and allowed to soften and/or swell (i.e., relax) in the boration solution, subsequently removed, and then extended. Alternatively, the polymeric sheet may be extended when still submerged into the boric acid solution.

The boration step may employ two (or more) baths. For example, in a two-bath boration treatement, the first bath may contain water, and the second, a boric ion contributing species. Alternatively, the order can be reversed or both baths may contain varying concentrations and/or mixtures of boric ion contributing species. Extension may be conducted in any one of these baths.

When the polymeric sheet is borated, the boration solution will generally comprise boric acid and either sodium or potassium hydroxide, or a substance from the class consisting of the sodium and potassium borates, preferably borax. The concentration of boric acid and borax or other borate in the solution or solutions to which the oriented polarizing sheet is subjected are not critical. Preferably, the boric acid is present in a higher concentration than the borax or other borate, and a preferred concentration range comprises 9%–12% by weight of boric acid and 3% by weight of borax. Preferably, the solutions should contain from about 1% to about 7% by weight of borax and from about 5% to about 20% by weight of boric acid. The polarizing sheets or films are imbibed in these solutions for a period of about one to about eight minutes and preferrably maintained at about 80° C. or higher.

Boration of the molecularly oriented polymeric sheet is subject to considerable variation. For example, the temperature of the boric acid solution may be varied, and the concentration thereof may be increased at the higher temperatures. It is desirable that the solution be heated at least 80° C. or greater in order to accomplish rapid "swelling" and cross-linking of the sheet.

One or more dichroic dyes may additionally be added to the polymeric sheet in order to neutralize the so-called "blue-leak" and/or "red-leak" of certain dichroic polarizers. Any of a variety of dichroic dyes may be used. Suitable dyes include any of the diazo, triazo or polyazo dyes, or other direct or acid dyes, such as "Intrajet Yellow DG" available from Sensient Technical Colors (Elmwood Park, N.J.) and "Evans Blue" available from Sigma-Aldrich. The dichroic dye may be added to the polymeric sheet at any stage in the process. For example, the dye may be cast into or coated onto the polymeric sheet before the initial stretch, or it may be added during the dehydration, boration, or extension step. A variety of time, temperatures, and concentrations may be used depending on the amount of stain required. Higher temperatures and/or higher concentrations may require less residence time for the polymeric sheet. Useful operating temperatures are from about room temperature to the boration temperature (greater than about 80° C.). For a dichroic yellow dye, a preferred concentration ranges from about 50 ppm to about 600 ppm for a temperature of about 135° F. and a residence time of about 1 to about 5 min. For a dichroic blue die, a preferred concentration ranges from about 0.1% to about 3% wt/wt for a temperature range of about room temperature to about 135° F. and a residence time of about 30 seconds to about 5 min. The dichroic dye may be placed in an aqueous boric acid solution or in a separate aqueous solution.

Subsequent to the extension step and/or boration step, the resulting enhanced K-type polarizer can again be bonded or laminated to a support layer, the support layer being the same or different from the layer stripped off, fumed, and/or oriented prior to extension thereof.

Figure 1:
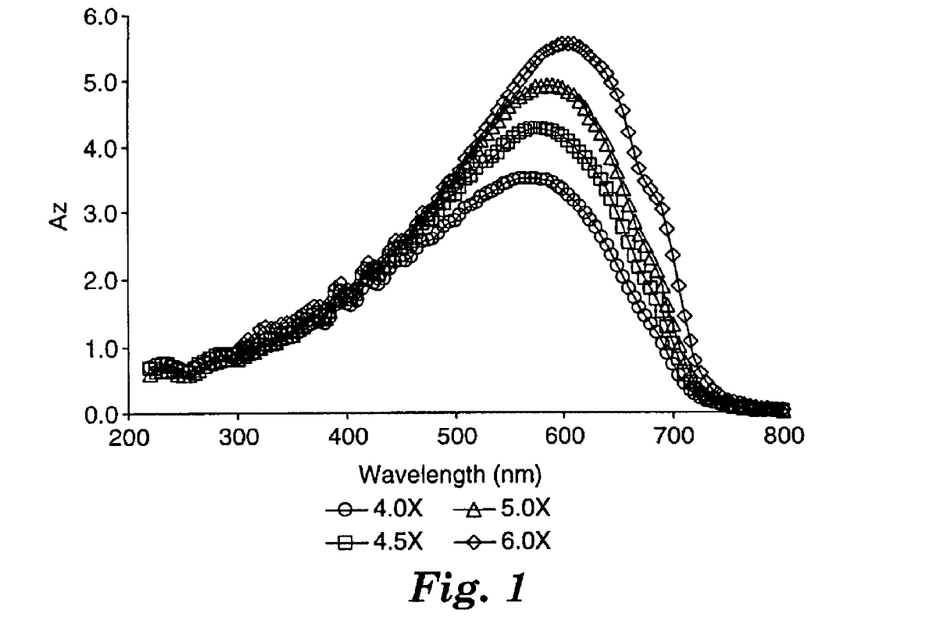
FIG. 1 is a graph showing the absorbance versus the wavelength for prior art polarizing sheets and polarizing sheets made according to an embodiment of the present invention.

FIG. 1 shows the absorbance versus the wavelength for two prior art K-polarizing sheets (sheets initially stretched at 4.0 times and 4.5 times the original length at a stretch temperature of 275° F.) and two polarizing sheets made according to an embodiment of the present invention (sheets initially stretched 5.0 times and 6.0 times the original length, at a stretch temperature of 320° F. and 360° F., respectively). As shown in the graph, the absorbance by the chromophores in each of the polarizers made according to an embodiment of the present invention is substantially larger than the absorbance by the corresponding chromophores in the representative prior art K-polarizers, and particularly so for the chromophores contributing to the polarizing properties in the near-red wavelengths of 600 nm to 700 nm.

The polarizers of the present invention also have absorption values that define a concentration distribution of oriented chromophoric moieties (i.e., the conjugated blocks) that is substantially uniform throughout wavelengths ranging from about 200 nm to about 700 nm, which results in a visually observable and highly desirable neutral gray tone in addition to improving polarizing properties. Table 1 shows the comparably uniform or "balanced" chromophoric concentration distribution for a polarizer of the present invention (designated "New KE") compared to two prior art K-polarizers (designated "KE" and "KN") at a transmittance, $K_v$, of 42%.

TABLE 1

| Conjugation Length (n) | Wavelength (nm) | Absorbance New KE | Relative Conc. | Absorbance KE | Relative Conc. | Absorbance KN | Relative Conc. |
| --- | --- | --- | --- | --- | --- | --- | --- |
| 2 | 233 | 0.4261 | | 0.3429 | | 0.3768 | |
| 3 | 276 | 0.3821 | | 0.3174 | | 0.3294 | |
| 4 | 309 | 0.3794 | | 0.3282 | | 0.3175 | |
| 5 | 339 | 0.3858 | | 0.3496 | | 0.3305 | |
| 6 | 372 | 0.3874 | | 0.3647 | | 0.3482 | |
| 7 | 394 | 0.3906 | | 0.3752 | | 0.3656 | |
| 8 | 420 | 0.3813 | | 0.3709 | | 0.3662 | |
| 9 | 445 | 0.3699 | | 0.3632 | | 0.3640 | |
| 10 | 472 | 0.3628 | | 0.3554 | | 0.3599 | |
| 11 | 492 | 0.3592 | | 0.3501 | | 0.3574 | |
| 12 | 512 | 0.3586 | | 0.3469 | | 0.3542 | |
| 13 | 527 | 0.3556 | | 0.3440 | | 0.3507 | |
| 14 | 543 | 0.3535 | | 0.3408 | | 0.3470 | |
| 15 | 557 | 0.3539 | | 0.3382 | | 0.3431 | |
| 16 | 571 | 0.3525 | 99.6% | 0.3352 | 99.1% | 0.3385 | 98.7% |
| 17 | 584 | 0.3490 | 98.6% | 0.3324 | 98.3% | 0.3327 | 97.0% |
| 18 | 595 | 0.3468 | 98.0% | 0.3298 | 97.5% | 0.3278 | 95.5% |
| 19 | 622 | 0.3387 | 95.7% | 0.3226 | 95.4% | 0.3089 | 90.0% |
| 20 | 637 | 0.3343 | 94.5% | 0.3182 | 94.1% | 0.2952 | 86.0% |
| 21 | 652 | 0.3270 | 92.4% | 0.3112 | 92.0% | 0.2714 | 79.1% |
| 22 | 667 | 0.3178 | 89.8% | 0.3008 | 88.9% | 0.2391 | 69.7% |
| 23 | 681 | 0.3109 | 87.9% | 0.2863 | 84.7% | 0.2028 | 59.1% |
| 24 | 695 | 0.3007 | 85.0% | 0.2519 | 74.5% | 0.1497 | 43.6% |
| 25 | 709 | 0.2363 | 66.8% | 0.1763 | 52.1% | 0.0904 | 26.4% |
| 26 | 728 | 0.1214 | 34.3% | 0.1180 | 34.9% | 0.0503 | 14.6% |
| 27 | 743 | 0.0763 | 21.5% | 0.0750 | 22.2% | 0.0341 | 9.9% |
| 28 | 759 | 0.0368 | 10.4% | 0.0430 | 12.7% | 0.0262 | 7.6% |
| 29 | 774 | 0.0245 | 6.9% | 0.0260 | 7.7% | 0.0228 | 6.6% |
| 30 | 789 | 0.0090 | 2.5% | 0.0090 | 2.7% | 0.0143 | 4.2% |

TABLE 2

| | New KE | KE | KN |
| --- | --- | --- | --- |
| Stretching Amount (× Original Length) | 6.0 | 4.5 | 3.6–3.9 |
| Stretch Temperature (° F.) | 360 | 275 | 250 |
| Boration Temperature (° F.) | 180 | 160–165 | 145 |
| Extension (%) | 1 | 25 | None |
| Boration Concentration (% boric acid/% borax) | 12/3 | 9/3 | 9/3 |

The conditions for making the polarizers are summarized in Table 2.

Figure 2:
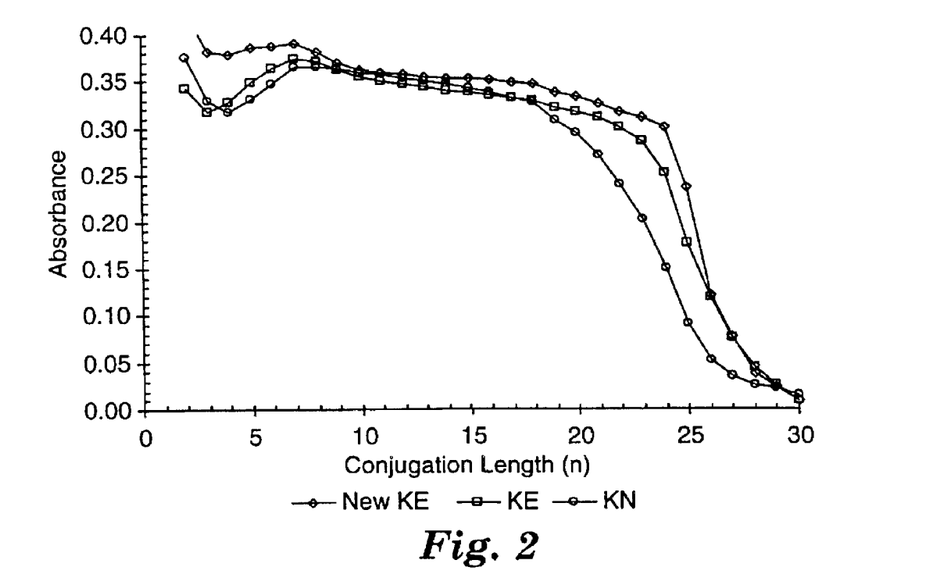
FIG. 2 is a graph showing the absorbance versus the conjugation length for two prior art polarizing sheets and a polarizing sheet made according to an embodiment of the present invention.

FIG. 2 is a graphical representation of the data in Table 1 with the absorbance plotted relative to the conjugation length. As shown in Table 1 and FIG. 2, the concentration of each of the polyvinylene blocks remains substantially constant as determined by the absorption by said blocks over the wavelengths ranging from about 250 nm to about 700 nm. Moreover, it will be particularly noted that the absorption-determined concentration of each of said polyvinylene blocks in the range of n=19 to 25 is not less than approximately 65% of the absorption-determined concentration of any of said polyvinylene blocks in the range of n=14 to 15. In this regard, each of the chromophores responsible for the polarizing properties in the near-red wavelength (i.e., n=19 to 25) has a relative concentration, based on the measure of its absorptance, that is no less than approximately 65% of the measured value for the chromophores responsible for polarization of wavelengths corresponding to the greatest human photopic sensitivity (i.e., 540 nm to 560 nm; n=14 to 15).

In the table above, relative concentration is calculated as follows:

$$\text{Rel. Conc.}_{(n-x)} = (\text{Absorption}_{(n-x)}/\text{Absorption}_{(n-q)}) \times 100$$

wherein x is a conjugation length, n, of 16 to 30, and q is a conjugation length, n, of 14 or 15. (In the above table, for purposes of illustration q is 14; calculated values would be comparable where q is 15.)

As evident from Table 1, the chromophoric distribution of the present polarizing sheet departs from that observed in the prior art K-polarizers, particularly for conjugation lengths 23 to 25, which may contribute to the so-called phenomenon of "red-leak". Aside from diminished optical properties, polarizers manifesting "red-leak" tend to have a brownish cast, which is undesirable for certain display applications from the standpoint of aesthetics.

A polarizer of the present invention has a degree of orientation of the molecules in conjunction with the concentration distribution of each polyvinylene block which results in a polarizing sheet having a photopic dichroic ratio ($R_D$) of at least 75.

In addition to a single polarizing sheet, such as described above, a pair of polarizers made according to the present invention may be positioned with their respective polarizing axes crossed (also referred to as a "crossed polarizer"). In this case, polarized light passing through the first polarizer of the pair can be "twisted" out of alignment with the polarizing axis of the second polarizer, thus blocking the transmission of light therethrough.

Figure 3:
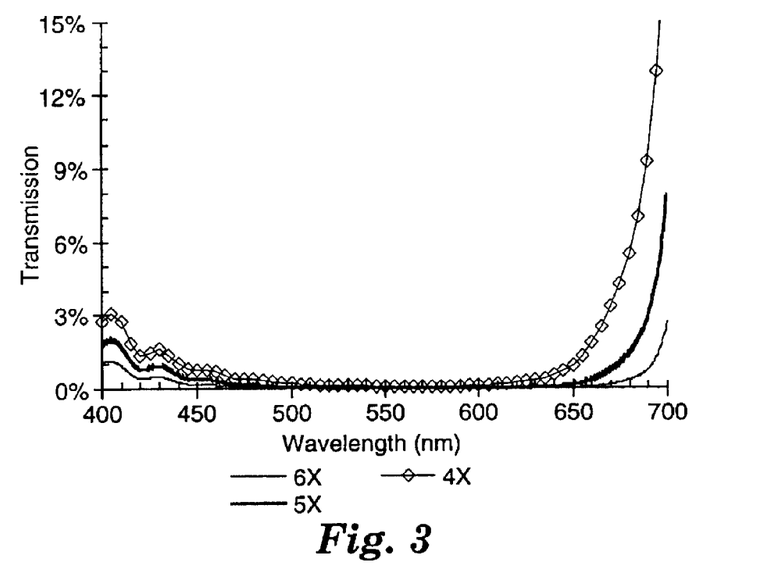
FIG. 3 is a graph showing the transmission versus the wavelength for a prior art crossed polarizer and crossed polarizers made according to an embodiment of the present invention.
Figure 4:
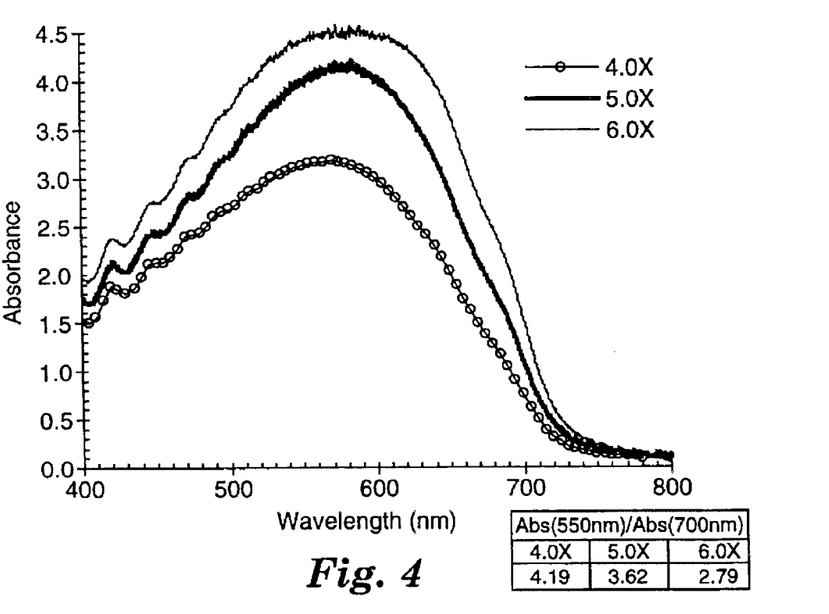
FIG. 4 is a graph showing the absorbance versus the wavelength for a prior art crossed polarizer and crossed polarizers made according to an embodiment of the present invention.

FIG. 3 and FIG. 4 show the percent light transmission and absorbance for a prior art crossed polarizer (designated "4X") compared to crossed polarizers made according to an embodiment of the present invention (designated "5X" and "6X") for a transmittance, $K_y$, of 42%. The conditions for preparing the sheets of the crossed polarizers are summarized in Table 3.

TABLE 3

|  | 4X | 5X | 6X |
| --- | --- | --- | --- |
| Stretching Amount (× Original Length) | 4.0 | 5.0 | 6.0 |
| Stretch Temperature (° F.) | 275 | 320 | 360 |
| Boration Temperature (° F.) | 160–165 | 165 | 180 |
| Extension (%) | 25 | <1 | 6 |

The transmittance was also determined using a UV/VIS spectrophotometer. As shown in FIG. 3 and FIG. 4, for a given transmittance, a crossed polarizer of the present invention provides a significant improvement in light absorption (reduced transmission) in the blue spectral region (i.e., 400 nm) and the red spectral region (i.e., 700 nm). In particular, the ratio of absorbance$_{(550\ nm)}$ to absorbance$_{(700\ nm)}$ is less than 3.75 for any given transmittance, $K_y$. The absorbance at 550 nm corresponding to the wavelength at which there is the greatest human photopic sensitivity.

Figure 5:
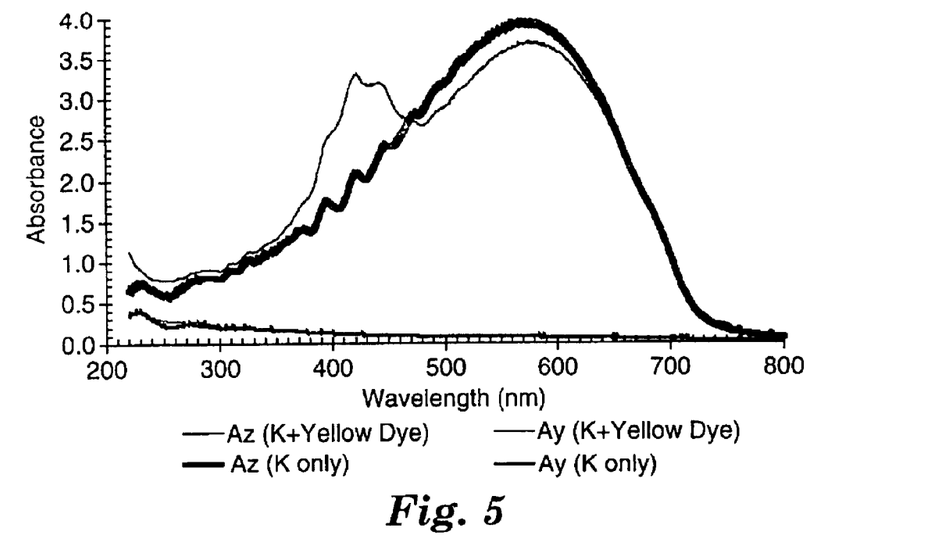
FIG. 5 is a graph showing the absorbance versus the wavelength for polarizing sheets made with and without dichroic yellow dye according to an embodiment of the present invention.
Figure 6:
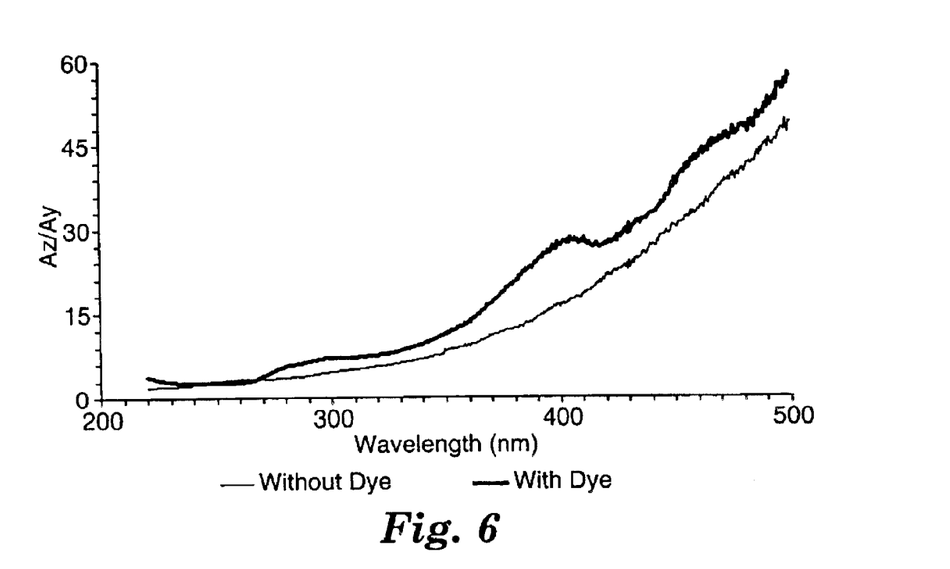
FIG. 6 is a graph showing the spectral dichroic ratio versus the wavelength for polarizing sheets made with and without dichroic yellow dye according to an embodiment of the present invention.

FIG. 5 and FIG. 6 show the absorbance and the spectral dichroic ratio, respectively, for a polarizing sheet prepared with and without a dichroic yellow dye according to an embodiment of the present invention. The polarizing sheets were initially stretched 5.0 times the original length at a 320° F. stretching temperature and a 173° F.–179° F. boration temperature with an additional 10% extension stretch. As shown in FIG. 5, the incorporation of a yellow dye into a K polarizer of the present invention results in a significant increase in light absorption in the blue spectral region ($A_z$ spectrum) without a similar increase in the $A_y$, or transmissive component. As shown in FIG. 6, the incorporation of a yellow dye into a K polarizer of the present invention also results in an improvement in the spectral dichroic ratio especially in the blue spectral region.

Figure 7:
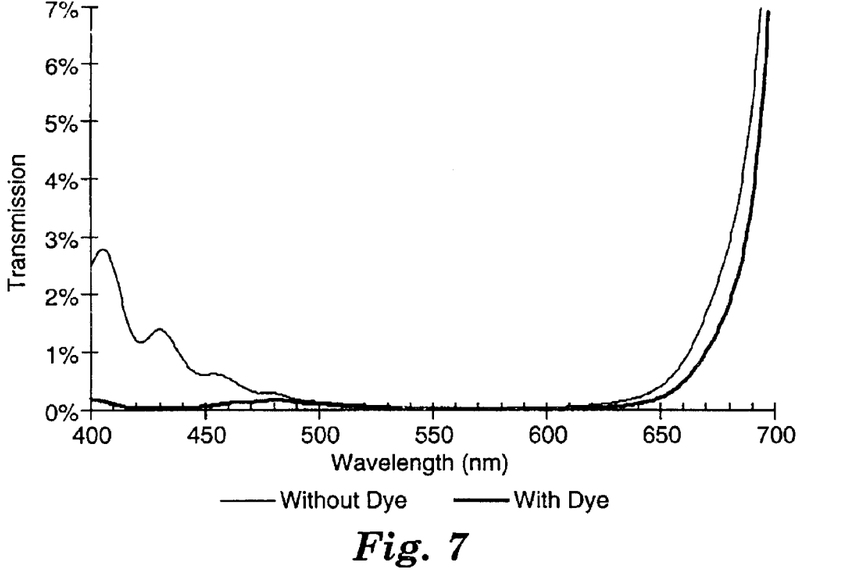
FIG. 7 is a graph showing the transmission versus the wavelength for crossed polarizers made with and without dichroic yellow dye according to an embodiment of the present invention.

Polarizing sheets prepared as described above with and without a dichroic yellow dye were used to form crossed polarizers. FIG. 7 shows the percent transmission versus wavelength for the resulting polarizers. A K polarizer made according to the present invention has substantially reduced all leakage of blue light in the crossed polarizer state. A colorimetry measurement was made for a single polarizing sheet and crossed polarizing sheets for a K polarizer made with a dichroic yellow dye (samples 1–5) and made without a dichroic yellow dye (control sample). As will be apparent to one skilled in the art, the a* value represents a color measurement on a red/green axis and the b* value represents a color measurement on a blue/yellow axis. On this type of color measurement system a neutral color, such as white or black, measures a value of zero.

TABLE 4

| | Hue | | | |
| --- | --- | --- | --- | --- |
| | Single | | Crossed | |
| Sample | A* | b* | a* | b* |
| Control | 0.6576 | 1.1946 | 9.4201 | −12.5171 |
| 1 | −1.9995 | 6.976 | 1.0743 | 0.4928 |
| 2 | −1.257 | 5.3589 | 1.1376 | 0.4152 |
| 3 | −0.4683 | 3.7342 | 1.2473 | 0.1485 |
| 4 | −0.03694 | 3.7804 | 1.039 | 0.0076 |
| 5 | −0.1638 | 3.1442 | 1.5398 | −0.4191 |

An Illuminant C common light source was used for the colorimetry measurements. As shown in Table 4, the color of the crossed polarizer changes from a dark, blue black (control sample) to a true neutral black (samples 1–5) with the addition of the dichroic yellow dye, though the single sheet color remains nearly indistinguishable from the polarizing sheet prepared without a dichroic yellow dye.

Figure 8:
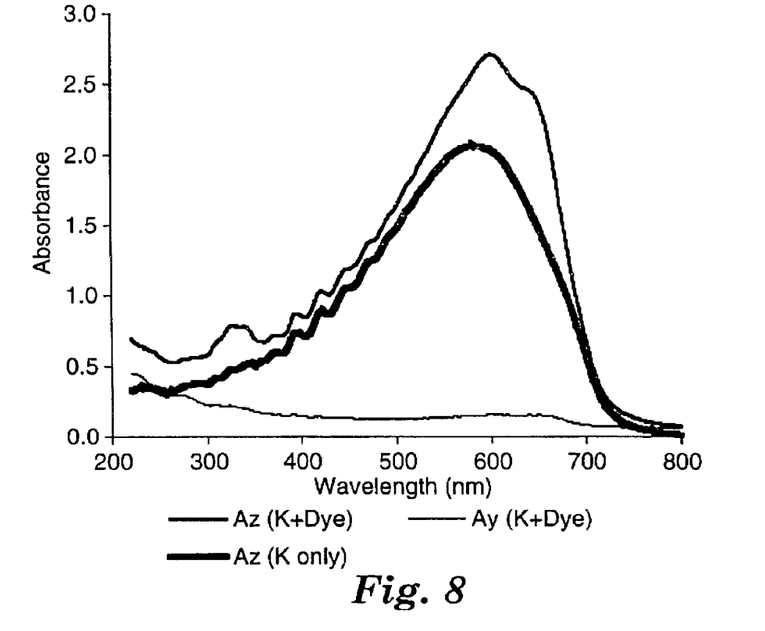
FIG. 8 is a graph showing the absorbance versus the wavelength for polarizing sheets made with and without a blue dichroic dye according to an embodiment of the present invention.

FIG. 8 shows the absorbance for polarizing sheets prepared with and without a blue dichroic dye according to an embodiment of the present invention. The polarizing sheets were prepared in the same manner as described for the dichroic yellow dye samples. As shown in FIG. 8, the incorporation of a blue dye into a K polarizer of the present invention results in a significant increase in light absorption in the red spectral region ($A_z$ spectrum) with only a minor increase in the $A_y$ or transmissive component.

The present invention is described herein using polymeric sheets derived from molecularly oriented polyvinyl alcohol. Vinylalcohol polymers include any linear 1,3-polyhydroxylated polymer or copolymer, or derivative thereof that may be dehydrated to a linear, conjugated vinylic polymer. Useful vinylalcohol polymers include polymers and copolymers of units of the formula:

wherein R is H, a $C_1$–$C_8$ alkyl, or an aryl group; and R' is H, or a hydrolysable functional group such as a $C_1$–$C_8$ acyl group. Preferably, R and R' are H. In addition to poly(vinyl alcohol) polymers and copolymers, specifically contemplated are polyvinyl acetals and ketals and esters as materials from which the molecularly oriented sheet or film can be formed. Useful co-monomers that may be polymerized with the vinylalcohol monomers to produce vinylalcohol copolymers may include any free-radically polymerizable monomers including olefins, such as ethylene, propylene and butylene, acrylates and methacrylates such as methyl (meth)acrylate, vinyl acetates and styrenes. Specifically contemplated for use in the present invention are copolymers of ethylene and vinylalcohol. Generally, the amount of co-monomer is less than 30 mole % and is preferably less than 10 mole %. Higher amounts may retard the formation of conjugated vinylene blocks (poly(acetylene) blocks) and deleteriously affect the performance of the polarizer.

The preferred vinylalcohol polymers are homo- and copolymers of polyvinyl alcohol. Most preferred are polyvinyl alcohol homopolymers. Commercially available polyvinyl alcohols, such as those available from Celanese Chemicals, Inc., Dallas, Tex., under the tradename CELVOL, are classified by viscosity and percent hydrolysis. Polyvinyl alcohols having low viscosities are preferred for ease of coating, while having a sufficiently high molecular weight to provide adequate moisture resistance and good mechanical properties.

Melt-processible polyvinyl alcohol may also be used in this invention. The melt processible vinylalcohol polymers are plasticized to enhance their thermal stability and allow them to be extruded or melt-processed. The plasticizer can be added externally or in the vinylalcohol polymer chain, i.e., the plasticizer is polymerized or grafted onto the vinylalcohol polymer backbone.

Vinylalcohol polymers that can be externally plasticized include commercially available products such as "Mowiol" 26-88 and "Mowiol" 23-88 vinylalcohol polymer resin available from Clariant Corp., Charlotte, N.C. These "Mowiol" vinylalcohol polymer resins have a degree of hydrolysis of 88%. "Mowiol" 26-88 vinylalcohol polymer resin has a degree polymerization of 2100 and a molecular weight of about 103,000.

Plasticizers useful in externally plasticizing vinylalcohol polymer are high boiling, water-soluble, organic compounds having hydroxyl groups. Examples of such compounds include glycerol, polyethylene glycols such as triethylene glycol and diethylene glycol, trimethylol propane, and combinations thereof. Water is also useful as a plasticizer. The amount of plasticizer to be added varies with the molecular weight of the vinylalcohol polymer. In general, the plasticizer will be added in amounts of between about 5% to about 30%, and preferably between about 7% to about 25%.

Lower molecular weight vinylalcohol polymers typically require less plasticizer than higher molecular weight vinylalcohol polymers. Other additives for compounding externally plasticized vinylalcohol polymers include processing aids (i.e. Mowilith DS resin from Hoechst A. G.), anti-blocking agents (i.e., stearic acid, hydrophobic silica), colorants, and the like.

Externally plasticized vinylalcohol polymers are compounded by slowly adding the organic plasticizer (and typically water) to the vinylalcohol polymer powder or pellets under constant mixing until the plasticizer is incorporated into the vinylalcohol polymer, which occurs when the batch reaches a temperature of from about 82° C. (180° F.) to about 121° C. (250° F.). The lower the molecular weight of the vinylalcohol polymer resin, the lower the maximum batch temperature required to incorporate the plasticizer. The batch is held at that temperature for about 5 to 6 minutes. The batch is then cooled to about between 71° C. (160° F.) and 93° C. (200° F.) at which time an anti-blocking agent can be added. The batch is further cooled to about 66° C. (150° F.) at which time the vinylalcohol polymer granulates can be removed from the mixer and extruded.

The compounding steps used to externally plasticize the vinylalcohol polymer can be eliminated when an internally plasticized vinylalcohol polymer is made except where it is desirable to add colorants, etc. Useful internally plasticized vinylalcohol polymers are commercially available. Such products include "Vinex" 2034 and "Vinex" 2025, both available from Air Products, Inc.

The Vinex trademark from Celanese represents a unique family of thermoplastic, water-soluble, polyvinylalcohol resins. Specifically, the "Vinex" 2000 series including "Vinex" 2034 and "Vinex" 2025 represent internally plasticized cold and hot water soluble polyvinylalcohol copolymer resins. Such internally plasticized vinylalcohol copolymers are described in U.S. Pat. No. 4,948,857 herein incorporated by reference. Such copolymers have the following general formula:

where R is hydrogen or methyl;
$R^1$ is a $C_6$–$C_{18}$ acyl group
y is 0 to 30 mole %;
z is 0.5 to 8 mole %; and
x is 70 to 99.5 mole %.

These copolymers retain the strength properties of poly(vinylalcohol) while also exhibiting increased flexibility. The acrylate monomer represented in the above formula gives the copolymer its internal plasticization effect. The degree of polymerization of the copolymers can range from about 100 up to 2500, but is preferably between about 200 and 800. The degree of polymerization is defined as the ratio of molecular weight of the total polymer to the molecular weight of the unit as referenced in formula I. Other internally plasticized poly(vinylalcohol) copolymer resins and preparation of these resins are discussed in U.S. Pat. No. 4,772,663. "VINEX" 2034 resin has a melt index typically of about 8.0 g/10 mins and a glass transition temperature of about 30° C. (86° F.). "VINEX" 2025 resin has a melt index typically of 24 g/10 mins and a glass transition temperature of about 29° C. (84° F.).

Polyvinyl alcohols and copolymers thereof, are commercially available with varying degrees of hydrolysis, e.g., from about 50% to 99.5+%. Preferred polyvinyl alcohols have a degree of hydrolysis from about 80% to 99%. In general, the higher the degree of hydrolysis, the better the polarizer properties. Also, polyvinyl alcohols with a higher degree of hydrolysis have better moisture resistance. Higher molecular weight polyvinyl alcohols also have better moisture resistance, but increased viscosity. In the practice of the invention, it is desirable to find a balance of properties in which the polyvinyl alcohol has sufficient moisture resistance, can be handled easily in a coating or casting process and can be readily oriented. Most commercial grades of poly(vinylalcohol) contain several percent residual water and unhydrolyzed poly(vinyl acetate).

Coating of the dispersion/solution may be accomplished by a variety of known methods, including, for example, coating the substrate using techniques, such as shoe coating, extrusion coating, roll coating, curtain coating, knife coating, die coating, and the like, or any other coating method capable of providing a uniform coating. The substrate may be coated with a primer or treated with a corona discharge to help anchor the polyvinyl alcohol film to the substrate. Suitable solution based primers are water-soluble copolyesters commonly used for priming polyethylene terephthalate films such as described in U.S. Pat. No. 4,659,523. After coating, the polyvinyl alcohol film is dried at a temperature typically from about 100° C. to 150° C. The thickness of the dried coating may vary depending on the optical characteristics desired but is typically from about 25 $\mu$m to 125 $\mu$m (1–5 mils).

Alternatively, the vinylalcohol polymer layer may be melt-processed. As with solution coating, a melt comprising the vinylalcohol may be cast onto a substrate such as a carrier web or support layer. The vinylalcohol polymer film may also be melt-blown. The vinylalcohol polymer melt may also be coextruded with the substrate using a variety of equipment and a number of melt-processing techniques (typically, extrusion techniques) well known in the art. For example, single- or multi-manifold dies, full moon feedblocks, or other types of melt processing equipment can be used, depending on the types of materials extruded.

Any of a variety of materials can be used for the carrier web or support layer. Suitable materials include known polymeric sheet materials such as the cellulose esters (e.g., nitrocellulose, cellulose acetate, cellulose acetate butyrate), polyesters, polycarbonates, vinyl polymers such as the acrylics, and other support materials that can be provided in a sheet-like, light-transmissive form. Polyesters are especially useful, depending on the particular application and the requirements thereof. A preferred polyester is polyethylene terephthalate, available under the Mylar and Estar tradenames, although other polyethylene terephthalate materials can be employed. The thickness of the support material will vary with the particular application. In general, from the standpoint of manufacturing considerations, supports having a thickness of about 0.5 mil (0.013 mm) to about 20 mils (0.51 mm) can be conveniently employed.

It will be apparent to those of ordinary skill in the art that light polarizing sheets embodying the product of the present invention may be laminated between or to supporting sheets or films, such as sheets of glass or sheets of other organic plastic materials, and that light polarizers of the present invention either in laminated or unlaminated form may be employed wherever other forms of light-polarizing plastic materials have heretofore been used, for example, in connection with liquid crystal display panels, emissive display devices, sunglasses, sun visors, window pane glass, CRT-monitor glare elimination systems, advertising displays, glare masks, and room partitions.

Any of a variety of adhesives can be used for laminating the polarizing sheets onto other layers or substrates including polyvinyl alcohol adhesives and polyurethane adhesive materials. Inasmuch as the polarizer will normally be employed in optical applications, an adhesive material which does not have an unacceptable affect on the light transmission properties of the polarizer will generally be employed. The thickness of the adhesive material will vary with the particular application. In general, thicknesses of about 0.20 mil (0.005 mm) to about 1.0 mil (0.025 mm) are satisfactory.

The product of the present invention is especially useful as a light-polarizing filter in display devices where the filter is positioned closely adjacent a relatively intense source of illumination which remains lighted continuously for long periods. Under these circumstances the polarizing filter may be subjected to temperatures in the neighborhood of 125° F. or even higher for protracted periods. A polarizer of the present invention shows no unacceptable loss in its high-efficiency polarizing properties, no discoloration, and no darkening after such protracted exposure to heat.

To further illustrate the present invention, the following Examples are provided, but the present invention is not to be construed as being limited thereto. Unless otherwise indicated, all parts, percents and ratios are by weight. In the Examples, the polarizing efficiency was calculated according to the following equation by determining the transmittance with axes parallel ($T_{par}$) which was determined by overlapping the sample polarizer with the high efficiency polarization analyzer in such a manner as to make the axes thereof parallel with each other, and the transmittance with axes crossed ($T_{perp}$), which was determined by overlapping the same in such a manner as to make the axes at right angles to each other.

$$\text{Polarizing efficiency } (\%) = (T_{par} - T_{perp})/(T_{par} + T_{perp}) \times 100$$

The ideal sets of maximum values of transmittance and polarizing efficiency of a polarizing film are 50% and 100%, respectively.

For all Examples, an aqueous boration solution was used having a 9%–12% boric acid and a 3% borax concentration.

EXAMPLES

Examples 1–5

Figure 9:
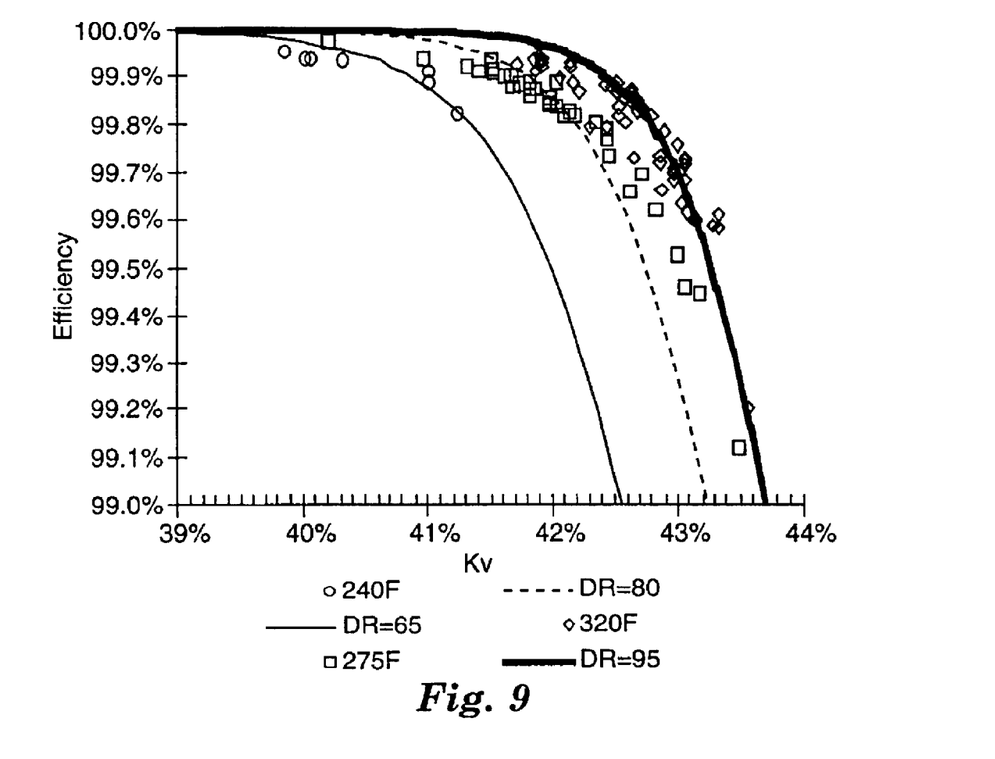
FIG. 9 is a graph showing the effect of stretch temperature on representative samples having an initial stretch of five times the original length.

Sheets (approximately 2 mils thick) of a high molecular weight polyvinyl alcohol (98.0% or greater hydrolysis) were unidirectionally stretched 5.0 times the original length of the sheets at three different stretching temperatures, 240° F., 275° F., and 320° F. The stretched sheets were then exposed to fuming hydrochloric acid vapors and heated to 325° F. to 350° F. Subsequently, the sheets were immersed in an aqueous solution of boric acid and borax at a temperature of 166° F. Upon removal from the solution, the sheets were unidirectionally extended an additional 10% to 15% such that the final degree of stretch for each sheet was 5.5 to 5.7 times the original length. FIG. 9 shows the efficiency versus the transmittance, $K_v$ for the resulting polarizers at the three different stretching temperatures. Table 5 compares the properties of the polarizers for a given polarizing efficiency.

TABLE 5

|  | Ex. 1 | Ex. 2 | Ex. 3 | Ex. 4 | Ex. 5 |
|---|---|---|---|---|---|
| Transmittance, $K_v$ (%) | 41.2 | 42.1 | 42.1 | 42.7 | 42.7 |
| Polarizing Efficiency (%) | 99.82 | 99.83 | 99.82 | 99.83 | 99.83 |
| Photopic Dichroic Ratio, $R_D$ | 63.8 | 79 | 77.4 | 94 | 93.6 |
| Stretch Temperature (° F.) | 240 | 275 | 275 | 320 | 320 |
| Extension (%) | 10 | 15 | 10 | 15 | 10 |

As evident from FIG. 9 and Table 5, the transmittance, $K_v$, and photopic dichroic ratio, $R_D$, improve as the stretching temperature increases. However, varying the amount of subsequent extension appears to have a smaller effect on the polarizing properties of the sheets than the increase in stretching temperature.

Examples 6–9

Figure 10:
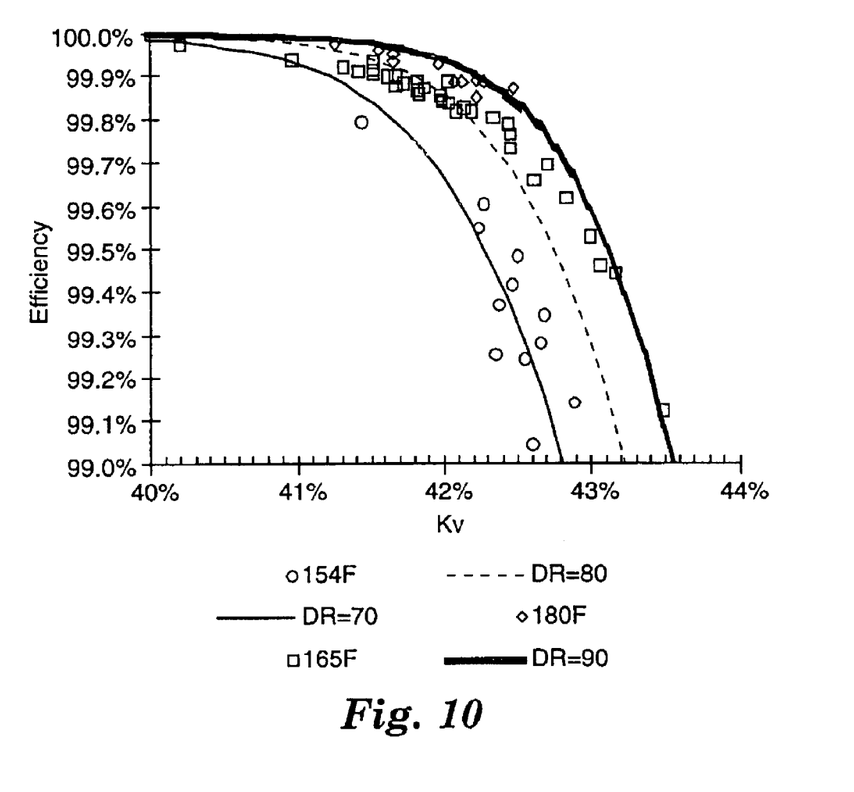
FIG. 10 is a graph showing the effect of boration temperature on representative samples having an initial stretch of five times the original length.

Sheets of polyvinyl alcohol were unidirectionally stretched 5.0 times the original length of the sheets at a stretching temperature of 275° F. for three of the samples and 320° F. for one sample. The sheets were then processed in a manner similar to Examples 1 to 5 except three different temperatures were used for the aqueous solution of boric acid and borax, 154° F., 165° F., and 180° F. FIG. 10 shows the efficiency versus the transmittance, $K_v$, for the resulting polarizers at the three different boration temperatures. Table 6 and Table 7 compare the properties of the polarizers for a given polarizing efficiency and a given transmittance, $K_v$, respectively.

TABLE 6

|  | Ex. 6 | Ex. 7 | Ex. 8 | Ex. 9 |
|---|---|---|---|---|
| Transmittance, $K_v$ (%) | 41.4 | 42.2 | 42.1 | 42.5 |
| Polarizing Efficiency (%) | 99.79 | 99.82 | 99.82 | 99.87 |
| Photopic Dichroic Ratio, $R_D$ | 65.2 | 79.5 | 77.4 | 90.6 |
| Boration Temperature (° F.) | 154 | 166 | 166 | 180 |
| Extension (%) | 10 | 15 | 10 | 10 |
| Stretching Temperature (° F.) | 275 | 275 | 275 | 320 |

TABLE 7

|  | Ex. 6 | Ex. 7 | Ex. 8 | Ex. 9 |
|---|---|---|---|---|
| Transmittance, $K_v$ (%) | 42.6 | 42.4 | 42.3 | 42.2 |
| Polarizing Efficiency (%) | 99.31 | 99.73 | 99.77 | 99.89 |
| Photopic Dichroic Ratio, $R_D$ | 69.7 | 81.6 | 80.4 | 85.7 |
| Boration Temperature (° F.) | 154 | 166 | 166 | 180 |
| Extension (%) | 10 | 15 | 10 | 10 |
| Stretching Temperature (° F.) | 275 | 275 | 275 | 320 |

As evident from FIG. 10, Table 6 and Table 7, transmittance, $K_v$, and photopic dichroic ratio, $R_D$, improve as the boration temperature increases. This means for a given efficiency the transmittance and dichroic ratio increase, producing a brighter polarizer. Again, varying the amount of subsequent extension appears to have a smaller effect on the polarizing properties of the sheets than the increase in boration temperature.

Examples 10–12

Figure 11:
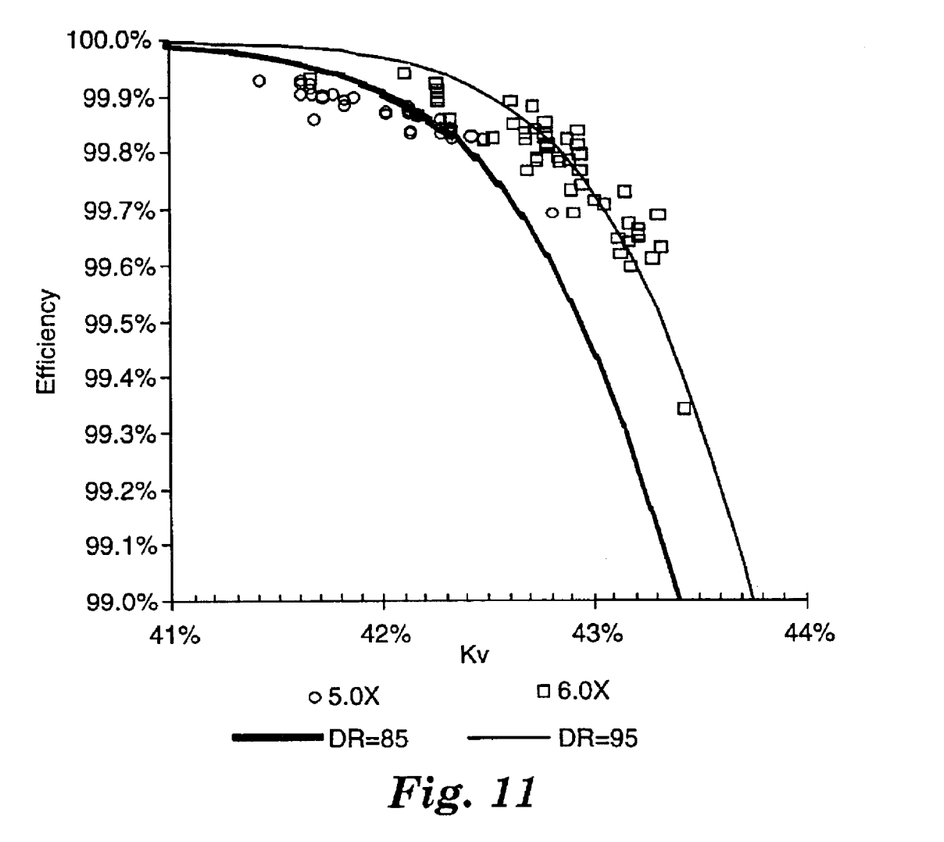
FIG. 11 is a graph showing the polarization efficiency versus transmittance, $K_v$, for polarizing sheets at various stretch ratios according to an embodiment of the present invention.

Sheets of polyvinyl alcohol were unidirectionally stretched 5.0 times and 6.0 times the original length of the sheets at a stretching temperature of 360° F. The sheets were then processed in a manner similar to Examples 1 to 5 except the boration temperature was 180° F. for all samples and the percent of extension was varied. FIG. 11 shows the efficiency versus the transmittance, $K_v$ for the resulting polarizers at the two different stretching amounts. Table 8 compares the properties of the polarizers for a given polarizing efficiency.

TABLE 8

|  | Ex. 10 | Ex. 11 | Ex. 12 |
|---|---|---|---|
| Transmittance, $K_v$ (%) | 41.8 | 42.4 | 42.4 |
| Polarizing Efficiency (%) | 99.90 | 99.90 | 99.90 |
| Photopic Dichroic Ratio, $R_D$ | 78.9 | 90.8 | 92.6 |
| Stretching Amount (× Original Length) | 5 | 10 | 10 |
| Extension (%) | 10 | 6 | 1 |

As evident from FIG. 11 and Table 8, transmittance, $K_v$, and photopic dichroic ratio, $R_D$, improve as the initial stretching increases. As shown, improved polarizing properties can be obtained with or without a subsequent extension step.

Examples 13–18

Sheets of polyvinyl alcohol were unidirectionally stretched 5.0 times the original length of the sheets at a stretching temperature of 320° F. The stretched sheets were then exposed to fuming hydrochloric acid vapors and heated to 325° F. to 350° F. The dehydrated sheets were delaminated from its plastic support and dipped into an aqueous boration solution containing 80 ppm of dichroic yellow dye for approximately 2–4 minutes at 135° F. The control sample was not subjected to a similar boration solution (without the dye) and simply proceeded to the next step. The sheets were then immersed in a separate boration solution at a temperature of 175° F. Finally, the sheets were unidirectionally extended an additional 15% such that the final degree of stretch for each sheet was 5.7 times the original length. Table 9 shows the polarization efficiency and transmittance for the resulting samples.

TABLE 9

|  | Ex. 13 (Control) | Ex. 14 | Ex. 15 | Ex. 16 | Ex. 17 | Ex. 18 |
|---|---|---|---|---|---|---|
| Transmittance, Kv (%) | 42.4 | 42.5 | 42.1 | 42.7 | 42.4 | 42.9 |
| Polarizing Efficiency (%) | 99.83 | 99.83 | 99.81 | 99.82 | 99.9 | 99.82 |

As evident in Table 9 and previously shown in FIG. 5–FIG. 7, polarizing sheets prepared with a dichroic yellow dye show a significant increase in light absorption in the blue spectral region and a significant reduction of the blue light leakage without sacrificing polarization properties.

Examples 19–20

Sheets of polyvinyl alcohol were unidirectionally stretched 5.0 times the original length of the sheets at a stretching temperature of 320° F. The stretched sheets were then exposed to fuming hydrochloric acid vapors and heated to 325° F. to 350° F. The dehydrated sheets were delaminated from its plastic support and dipped into an aqueous solution containing 1% wt/wt of blue dichroic dye for approximately 1 minute at room temperature. The control sample was not subjected to a similar step and simply proceeded to the next step. The sheets were then immersed in a boration solution for approximately 5 minutes at a temperature of 82° C. Finally, the sheets were unidirectionally extended an additional 10% such that the final degree of stretch for each sheet was 5.5 times the original length.

In summary, as evident from Examples 1 to 20, demonstrably improved polarizing properties can be obtained by implementing a higher initial stretch at higher stretching temperatures in a K-sheet manufacturing process. However, since certain changes and modifications in the article and method which embody the invention can be made, it is intended that all matter contained in the Examples be considered illustrative and not definitive.

What is claimed is:

1. A method for making a polarizer from a polymeric sheet having a predetermined original length and comprising a hydroxylated linear high polymer, the method comprising:

stretching the polymeric sheet from greater than 5.0 times to approximately 6.0 times the original length at a temperature greater than 300° F.;

introducing a suitable dehydration catalyst to the polymeric sheet; and heating the polymeric sheet and the catalyst at a temperature appropriate to effect partial dehydration of the polymeric sheet wherein light absorbing, vinylene block segments are formed.

2. The method of claim 1, wherein the hydroxylated linear high polymer is polyvinyl alcohol, polyvinyl acetal, polyvinyl ketal, or polyvinyl ester.

3. The method of claim 1, wherein the introducing step comprises exposing the polymeric sheet to fuming acidic vapors.

4. The method of claim 1, wherein the introducing step comprises coating the polymeric sheet with an acid coating.

5. The method of claim 1, wherein the introducing step comprises placing an acid donor layer adjacent to the polymeric sheet; and exposing the acid donor layer to a radiant energy to release one or more molecules of acid.

6. The method of claim 5, wherein the radiant energy is thermal energy or ultraviolet light energy.

7. The method of claim 1, wherein the stretching is bidirectional relaxed, bidirectional unrelaxed, unidirectional relaxed, unidirectional unrelaxed, or parabolic.

8. The method of claim 1 further comprising subjecting the polymeric sheet to a boration treatment at an elevated temperature.

9. The method of claim 8 further comprising unidirectionally extending the stretched and heated polymeric sheet greater than 0% to about 70% of the stretched length.

10. The method of claim 9, wherein the subjecting step and the extending step are performed concurrently.

11. The method of claim 9, wherein the subjecting step is performed before the extending step.

12. The method of claim 8, wherein the boration treatment temperature is greater than about 80° C.

13. The method of claim 1, further comprising adding at least one dichroic dye to the polymeric sheet.

14. The method of claim 13 further comprising subjecting the polymeric sheet to a boration treatment at an elevated temperature, wherein the adding step and the subjecting step are performed concurrently.

15. The method of claim 13 further comprising subjecting the polymeric sheet to a boration treatment at an elevated temperature, wherein the adding step is performed before the subjecting step.

16. The method of claim 8, wherein the boration treatment comprises placing the polymeric sheet in contact with an aqueous solution comprising boric acid.

17. The method of claim 16, wherein the boric acid concentration ranges from about 5% to about 20%.

18. The method of claim 16, wherein the aqueous solution further comprises borax.

19. The method of claim 18, wherein the borax concentration ranges from about 1% to about 7%.

20. The method of claim 13, wherein the at least one dichroic dye is a yellow dye, a blue dye, or a combination thereof.

21. The method of claim 1, wherein the polymeric sheet is supported on a carrier web or a support layer.

22. A method for making a polarizer from a polymeric sheet having a predetermined original length and comprising a hydroxylated linear high polymer, the method comprising:

stretching the polymeric sheet from greater than 5.0 to approximately 6.0 times the original length at a temperature greater than 300° F.;

introducing a suitable dehydration catalyst to the polymeric sheet;

heating the polymeric sheet and the catalyst at a temperature appropriate to effect partial dehydration of the polymeric sheet wherein light absorbing, vinylene block segments are formed;

subjecting the polymeric sheet to a boration treatment at a temperature greater than about 80° C.; and unidirectionally extending the polymeric sheet greater than 0% to about 70% of the stretched length.

23. The method of claim 22, wherein the hydroxylated linear high polymer is polyvinyl alcohol, polyvinyl acetal, polyvinyl ketal, or polyvinyl ester.

24. The method of claim 22, wherein the introducing step comprises exposing the polymeric sheet to fuming acidic vapors.

25. The method of claim 22, wherein the introducing step comprises coating the polymeric sheet with an acid coating.

26. The method of claim 22, wherein the introducing step comprises placing an acid donor layer adjacent to the polymeric sheet; and exposing the acid donor layer to a radiant energy to release one or more molecules of acid.

27. The method of claim 26, wherein the radiant energy is thermal energy or ultraviolet light energy.

28. The method of claim 22, wherein the stretching is bidirectional relaxed, bidirectional unrelaxed, unidirectional relaxed, unidirectional unrelaxed, or parabolic.

29. The method of claim 22, wherein the subjecting step and the extending step are performed concurrently.

30. The method of claim 22, further comprising adding at least one dichroic dye to the polymeric sheet.

31. The method of claim 30, wherein the adding step and the subjecting step are performed concurrently.

32. The method of claim 30, wherein the adding step is performed before the subjecting step.

33. The method of claim 30, wherein the at least one dichroic dye is a yellow dye, a blue dye, or a combination thereof.

34. The method of claim 22, wherein the boration treatment comprises placing the polymeric sheet in contact with an aqueous solution comprising boric acid.

35. The method of claim 34, wherein the boric acid concentration ranges from about 5% to about 20%.

36. The method of claim 34, wherein the aqueous solution further comprises borax.

37. The method of claim 36, wherein the borax concentration ranges from about 1% to about 7%.

38. The method of claim 22, wherein the polymeric sheet is supported on a carrier web or a support layer.

* * * * *

UNITED STATES PATENT AND TRADEMARK OFFICE
CERTIFICATE OF CORRECTION

PATENT NO. : 6,814,899 B2
DATED : November 9, 2004
INVENTOR(S) : Cael, John J.

It is certified that error appears in the above-identified patent and that said Letters Patent is hereby corrected as shown below:

<u>Title page,</u>
Item [75], Inventors, please add inventor -- Babu N. Gaddam, Woodbury, MN --.

<u>Column 1,</u>
Line 67, delete "Summary of the Invention"

<u>Column 2,</u>
Line 1, insert as a heading -- SUMMARY OF THE INVENTION --

<u>Column 8,</u>
Line 59, delete "preferably" and insert -- preferably --.

<u>Column 13,</u>
Line 4, delete "moleculary" and insert -- molecularly --.

<u>Column 18,</u>
Line 44, in Table 9, delete "Kv" and insert -- $K_v$ --

Signed and Sealed this

Twenty-fourth Day of May, 2005

JON W. DUDAS
*Director of the United States Patent and Trademark Office*